UNITED STATES PATENT OFFICE.

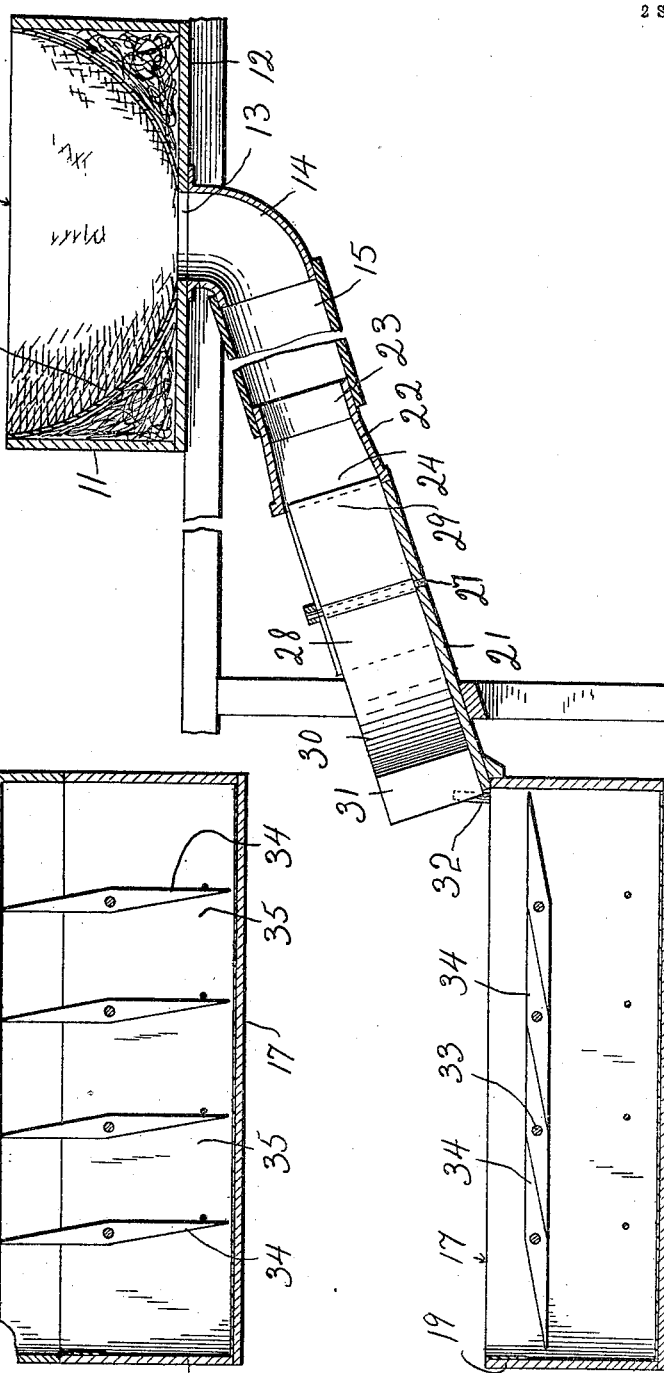

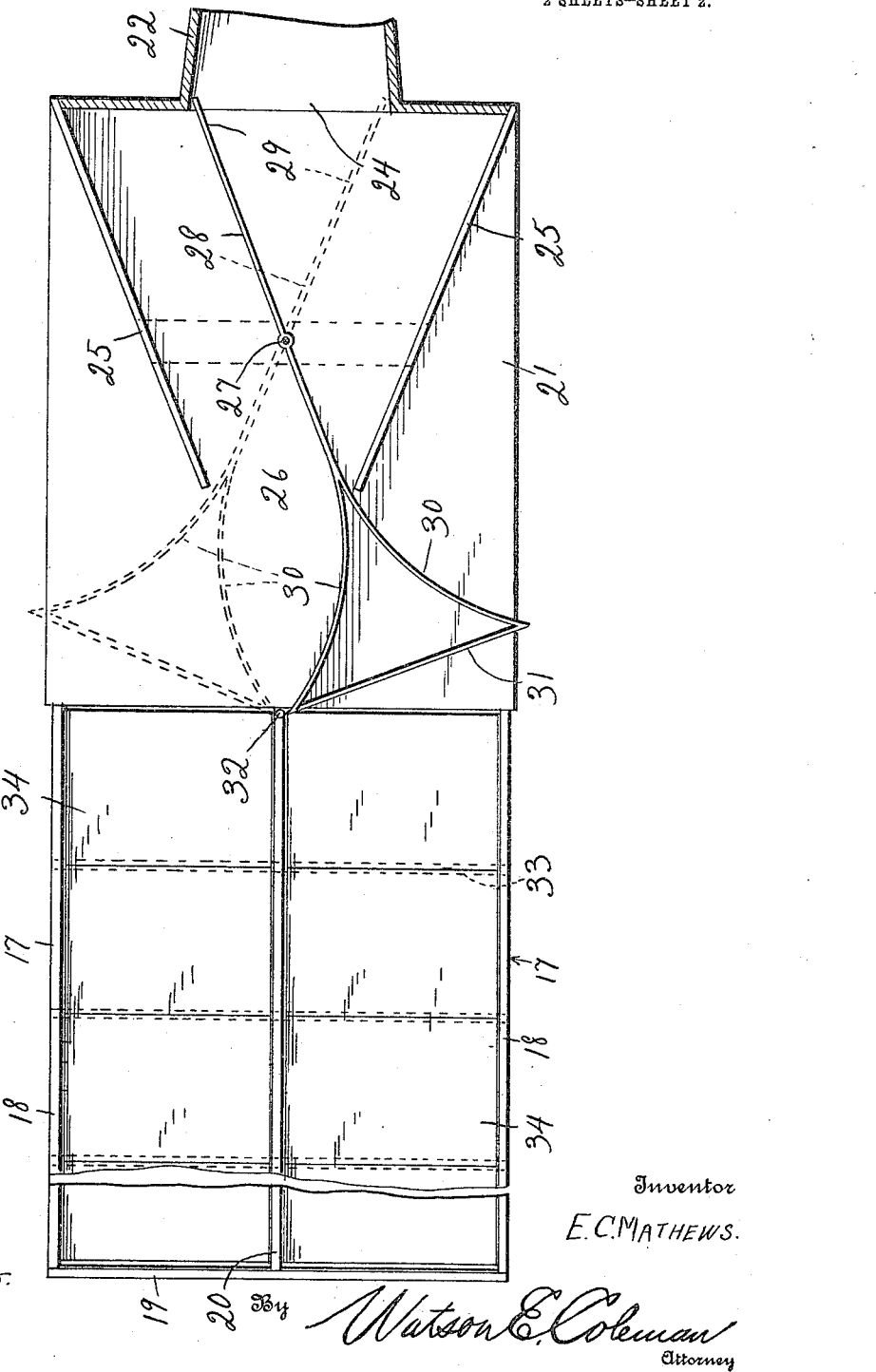

ERNEST C. MATHEWS, OF MINNEAPOLIS, MINNESOTA.

HEN'S NEST.

1,106,517.

Specification of Letters Patent. Patented Aug. 11, 1914.

Application filed April 3, 1913. Serial No. 758,660.

*To all whom it may concern:*

Be it known that I, ERNEST C. MATHEWS, a citizen of the United States, residing at Minneapolis, in the county of Hennepin and State of Minnesota, have invented certain new and useful Improvements in Hens' Nests, of which the following is a specification, reference being had to the accompanying drawings.
This invention relates to new and useful improvements in hens' nests.

An object of this invention is the provision of a hen's nest so constructed, that the eggs will be removed therefrom when laid.
Another object of this invention is the provision of means for removing eggs from a hen's nest and arranging them in separate compartments in a receptacle.

A further object of this invention is the provision of means for directing the eggs into the various compartments of the receptacle.

A still further object of this invention is to improve and simplify devices of this character, rendering them comparatively simple and inexpensive to manufacture, reliable and efficient in use, and readily operated.

With the above and other objects in view this invention resides in the novel features of construction, formations, combinations and arrangements of parts to be hereinafter more fully described, claimed and illustrated in the accompanying drawings, in which—
Figure 1 is a longitudinal section view of my invention. Fig. 2 is a top plan view thereof with the nest removed and partly in section. Fig. 3 is a transverse sectional view thereof.
Referring to the accompanying drawings by similar characters of reference, the numeral 10 designates generally a hen's nest consisting of the opposite side and end walls 11 and bottom 12. The central portion of the bottom 12 is provided with an opening 13, of a size to permit the passage of an egg therethrough, while extending downwardly from this opening is a tubular attaching flange 14 for engagement with the upper extremity of a flexible tubular connecting member 15. The nest 10 is provided with a suitable padded lining 16 which slopes downwardly from the opposite sides of the nest toward the opening 13 in order to direct the eggs therethrough. A receptacle 17 is removably supported in any preferred manner below the nest 14 and consists of opposite side walls 18 connected by the end walls 19, which in turn are connected by a longitudinal partition 20 which extends through the receptacle 17 in equal spaced relation to its side walls 18. A guide plate 21 extends from one end of the receptacle 17 flush with the upper edges of the side walls 18 and partition 20. A tubular connecting member 22 is secured to the free end of the guide member 21 and is provided with a rounded outer extremity 23 for engagement with the free end of the tubular member 15, and an angular inner end or mouth 24. Inwardly converging stationary deflector plates 25 are secured to the upper side of the board 21 and extend from the outer end thereof inwardly to the central portion. The converging ends of these boards 25 are spaced apart to produce a passage 26 in which is mounted a vertically extending spindle 27 to which is pivoted a movable deflector 28, which comprises a vertically disposed rectangular plate 29 having its outer end curved outwardly in opposite directions, as at 30, and connected by a transverse brace plate 31 while the opposite end portion of the plate 29 is extended within the mouth of the guide member 21 and being adapted to contact with the walls thereof whereby the transverse movement of the deflector is limited. The inner end of this deflector 28 is disposed within the mouth of the tubular connecting member 22, for a purpose which will be later explained. When the deflector 28 moves to its opposite limits, the rectangular plate 29 is moved to the opposite sides of the connecting member 22. A resilient latch 32 of rubber or the like is secured to the receptacle 17 intermediate the opposite sides thereof and adjacent its rear end, for engagement with the opposite ends of the curved portions 30 of the deflector 28, for holding the latter adjacent the converged terminals of the stationary deflector plates 25. A plurality of equal-spaced parallel rods 33 are secured to the opposite sides 18 of the receptacle 17 and extend through the partition 20, and pivoted upon these rods 33 are closing plates 34 having their opposite horizontal edges disposed upon opposite sides of the rods 33, so that the outer end of each plate will rest upon the inner end of each adjacent plate, thereby retaining said plates in horizontal planes. The outer horizontal edges of the lower plates 34 are the only ones which do not rest upon another plate.

The operation of the device is, as follows: The eggs upon being laid pass through the opening 14 of the nest down through the tubular members 15 and 22, and roll down the board 21 between the contacting plates 25 and 29. The weight of the eggs force the plate 29 to its opposite position as shown in the dotted lines, thus permitting the eggs to roll over the plates 34 until reaching the lower plate in which movement they are limited by the outer end 19 of the receptacle 17. The weight of the egg upon the plate 34 causes it to swing upon its pivotal point until it assumes the dotted position shown in the drawings, in which position the upper end forms a partition corresponding to the outer end 19 of the receptacle, for limiting the movement of the next egg and causing the next plate to be lowered in a similar manner. It will be apparent that as each egg passes over the board 21, the deflector 28 will be turned so that the plate 29 engages first one side of the mouth of the board 22 and then the opposite side, thus depositing the eggs in the compartments 35 first at one side of the receptacle and then at the other side of the receptacle, until all of the compartments are filled. A removable closure 36 is provided for the receptacle when the same is removed from the nests. In use the receptacles 27 can be either replaced by empty receptacles, or the eggs removed therefrom and the receptacle returned to its proper position. It is desired to have the board removably connected to the end of the receptacle 17, so that when in its proper position, it will be held rigid thereto, and also so that the receptacle 17 can be detached from the board 21 without removing the latter from the nest.

It should be understood in this connection that various minor changes in the different details of construction can be resorted to within the scope of the appended claims, without departing from or sacrificing any of the advantages of the invention.

Having thus fully described this invention, what I claim as new and desire to protect by Letters Patent is:

1. A device of the character described including a nest, a guide board, a hollow member affording communication between the nest and the guide board, stationary deflector plates carried by the board, an intermediate deflector plate pivotally supported intermediate its length, the outer end of such intermediate deflector being provided with opposed curved portions while the opposite end portion projects within the hollow member and adapted for contact with the walls thereof and a suitably mounted resilient latch adapted to engage the opposite faces of the intermediate deflector plate to maintain the same normally against movement about its pivot.

2. A device of the character described including a nest, a guide board, a hollow member affording communication between the nest and the guide board, stationary deflector plates carried by the board, an intermediate deflector plate pivotally supported intermediate its length, the outer end of such intermediate deflector being provided with opposed curved portions while the opposite end portion projects within the hollow member and adapted for contact with the walls thereof, a receptacle positioned adjacent the guide board divided longitudinally into compartments with which the intermediate deflector is adapted for alternate coöperation and a resilient latch projecting from the receptacle and intersecting the path of travel of the intermediate deflector plate and adapted to contact with the opposite faces thereof.

3. A device of the character described including a nest, a guide board, a hollow member affording communication between the nest and the guide board, stationary deflector plates carried by the board, an intermediate deflector plate pivotally supported intermediate its length, the outer end of such intermediate deflector being provided with opposed curved portions while the opposite end portion projects within the hollow member and adapted for contact with the walls thereof, a receptacle positioned adjacent the guide board divided longitudinally into compartments with which the intermediate deflector is adapted for alternate coöperation, a resilient latch projecting from the receptacle and intersecting the path of travel of the intermediate deflector plate and adapted to contact with the opposite faces thereof, and plates pivotally supported within each of the compartments adjacent the upper portion thereof and disposed in overlapping relative relation.

In testimony whereof I hereunto affix my signature in the presence of two witnesses.

ERNEST C. MATHEWS.

Witnesses:
 JOHN G. ANDERSON,
 R. A. WHITE.

Copies of this patent may be obtained for five cents each, by addressing the "Commissioner of Patents, Washington, D. C."